United States Patent [19]

Sato

[11] Patent Number: 5,021,728
[45] Date of Patent: Jun. 4, 1991

[54] POWER SOURCE APPARATUS FOR ELECTRONIC EQUIPMENT

[75] Inventor: Shoji Sato, Yokohama, Japan

[73] Assignee: Canon Kabushiki Kaisha, Tokyo, Japan

[21] Appl. No.: 437,034

[22] Filed: Nov. 15, 1989

[30] Foreign Application Priority Data

Nov. 17, 1988 [JP]  Japan .............................. 63-288831

[51] Int. Cl.⁵ .............................................. G05F 1/46
[52] U.S. Cl. ..................................... 323/272; 323/299
[58] Field of Search ............... 323/271, 272, 282, 285, 323/299; 307/44–46, 75, 80, 85, 86; 315/86; 368/203, 204; 365/227

[56] References Cited

U.S. PATENT DOCUMENTS

| | | | |
|---|---|---|---|
| 4,404,624 | 9/1983 | Yamazaki | 368/204 |
| 4,441,825 | 4/1984 | Morokawa | 368/203 |
| 4,485,432 | 11/1984 | Kidena et al. | 368/204 |
| 4,528,459 | 7/1985 | Wiegel | 307/86 |
| 4,683,382 | 7/1987 | Sakurai et al. | 365/227 |
| 4,730,122 | 3/1988 | Dreibelbis et al. | 307/75 |

Primary Examiner—Peter S. Wong
Attorney, Agent, or Firm—Fitzpatrick, Cella, Harper & Scinto

[57] ABSTRACT

A power source apparatus used in electronic equipment includes a power source for supplying a power source voltage, a voltage transformer for transforming the power source voltage supplied from the power source into a voltage different from the power source voltage, a load driven by the voltage supplied from the power source, a transistor for switching between the voltage output from the voltage transformer and the voltage directly output from the power source and supplying one of the voltages output from the voltage transformer and the power source to the load, and a controller for switching the transistor to select the voltage output from the voltage transformer when a level of the power source voltage exceeds a predetermined value, and for switching the transistor to select the voltage directly output from the power source when the level of the power source voltage is below the predetermined value.

15 Claims, 8 Drawing Sheets

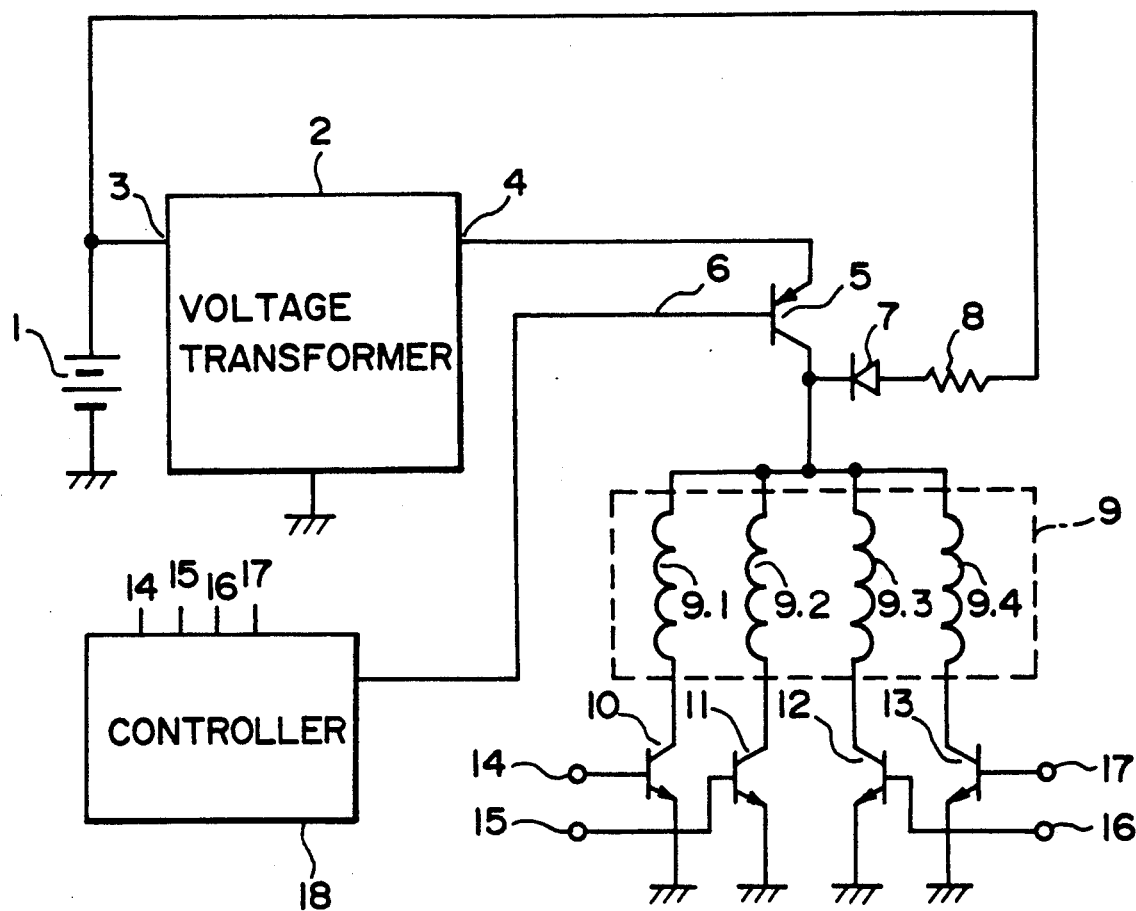
F I G. 1

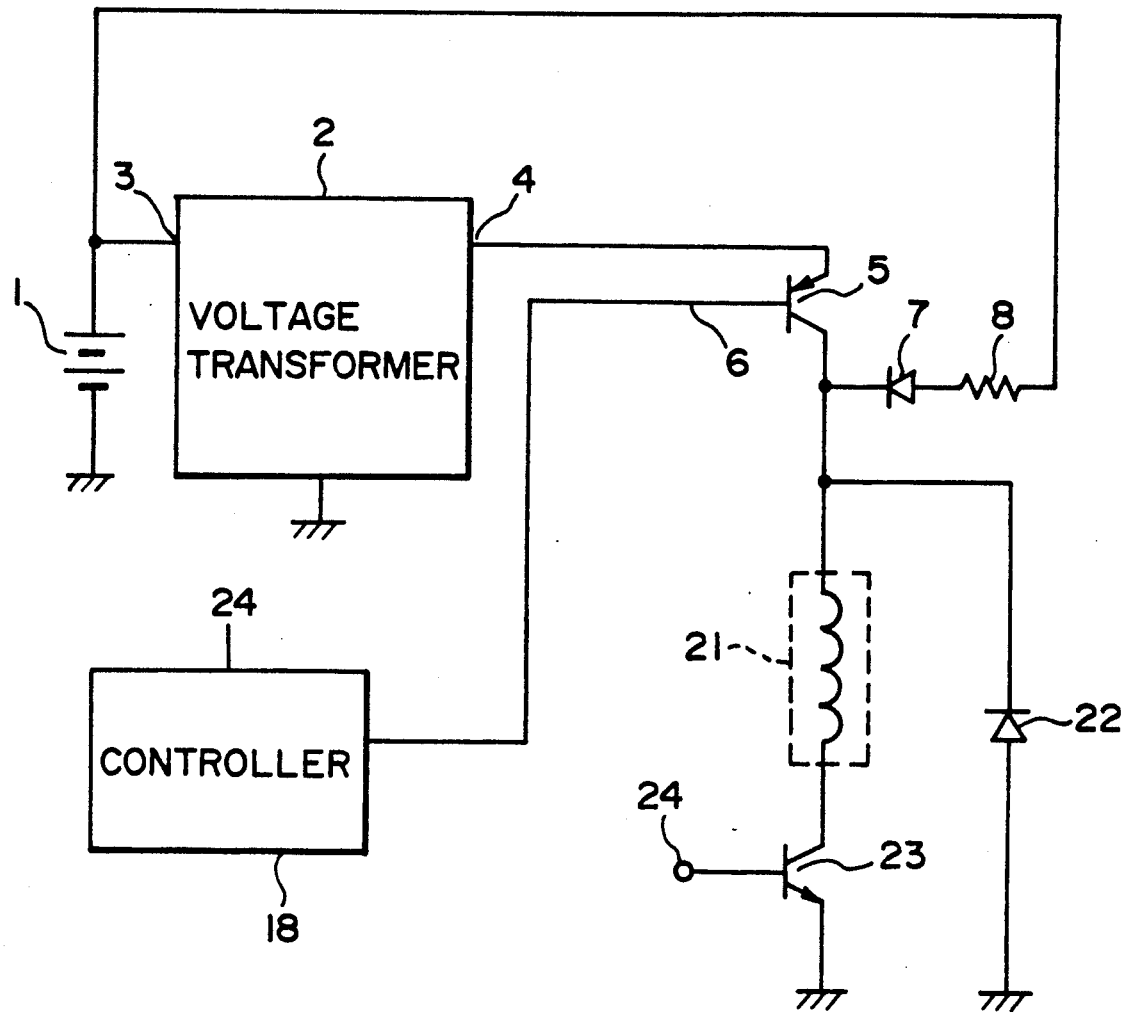
F I G. 2

POWER SOURCE APPARATUS FOR ELECTRONIC EQUIPMENT

BACKGROUND OF THE INVENTION (a) Field of the Invention

The present invention relates to a power source apparatus used in electronic equipment such as an electronic typewriter.

(b) Related Background Art

In a power source apparatus which uses batteries whose power source voltage cannot be kept constant and which drives, e.g., a motor in electronic equipment, an unstable voltage is boosted or dropped to a given constant voltage level, and the motor or the like is driven by the stabilized voltage.

FIG. 6 shows an example of a conventional power source apparatus. A voltage 3 supplied from batteries 1 is output through a voltage transformer 71 as stable voltages $V_H.72$ and $V_L.73$. This apparatus exemplifies a circuit for driving a 4-phase stepping motor 9. Windings 9.1 to 9.4 of the motor 9 are driven by transistors 5, 10, 11, 12, and 13.

When a control signal 6 is set at "L" (low) level, the transistor 5 is turned on. In addition, when a control signal 14 is set at "H" (high) level, the transistor 10 is turned on. A current flows from the output $V_H.72$ of the voltage transformer 71 to the transistor 10 through the transistor 5 and the winding 9.1. Similarly, currents flow or do not flow through the windings 9.2, 9.3, and 9.4 of the motor 9 in response to control signals 15, 16, and 17, respectively.

As a result, the motor 9 is rotated in accordance with a sequence of the control signals 14 to 17.

When the control signal 6 is set at "H" level to disable the transistor 5, and a terminal 74 is connected to the output $V_H.72$, as indicated by a dotted line in FIG. 6, a current flows from the output $V_H.72$ to the winding of the motor 9 through a resistor 8 and a diode 7. In this case, an amount of current flowing through the motor 9 is smaller by a voltage drop through the resistor 8 as compared with the former case. The operations of the former and latter cases will be briefly described with reference to FIG. 7.

FIG. 7 shows a current waveform of one phase when the motor 9 is driven by 2-phase excitation. The motor 9 is driven while the transistor 5 is kept ON. Referring to FIG. 7, for example, a current starts to flow through the winding 9.1 while the transistor 10 is kept ON. The transistor 10 is then turned off, and the current flowing though the winding 9.1 becomes zero. Thereafter, the transistor 10 is turned on to cause the current to flow through the winding 9.1 again. When the transistor 5 is turned off during the ON state of the transistor 10, a current $I_L$ smaller than that during motor rotation flows through the winding 9.1. The current $I_L$ is adjusted by the resistance of the resistor 8. A small current is generally supplied to the motor to hold the phase position so as not to offset it from the proper position of the corresponding phase during the stop state of the stepping motor. This small current value is determined by a load of an apparatus connected to a motor. Referring to FIG. 6 when the terminal 74 is connected to the output $V_H.72$, the power consumption of the resistor 8 is increased. When the voltage $V_L.73$ satisfying $V_H > V_L$ is generated by the voltage transformer and connected to the terminal 74, the power consumption of the resistor 8 can be reduced, and power consumption of the batteries 1 can also be reduced. This method can be employed to cause the small current $I_L$ to flow. However, the voltage transformer 71 is undesirably complicated, thus increasing cost.

In the above prior art, the small current $I_L$ of the motor is derived from the output $V_H.72$ or $V_L.73$ through the voltage transformer 71. However, the voltage transformer 71 also consumes power, and transformation efficiency cannot be given as 100% but is reduced to about 70 to 90%. Furthermore, when the power source comprises batteries, this transformation efficiency is very important to determine the battery service life. In particular, when the power source voltage is gradually decreased upon long-term use of the batteries, the efficiency is degraded accordingly. Therefore the service life of the batteries is rapidly shortened.

When the voltage $V_H.72$ is connected to the terminal 74 as in the conventional case, the power consumption of the resistor 8 is increased due to heat dissipation. However, when the voltage output level is made higher by using the voltage $V_L.73$ or the like, the voltage transformer is complicated only to result in high cost

SUMMARY OF THE INVENTION

It is a first object of the present invention to provide a power source apparatus capable of minimizing waste of power consumption of a power source.

It is a second object of the present invention to provide a power source apparatus capable of controlling a voltage applied to a motor or the like in accordance with a power source voltage level.

It is a third object of the present invention to provide a power source apparatus capable of controlling a voltage applied to a motor or the like in accordance with whether a power source voltage level exceeds a predetermined value.

It is a fourth object of the present invention to provide a power source apparatus capable of controlling a voltage applied to a motor or the like in accordance with an operating state of a driving means such as a motor.

BRIEF DESCRIpTION OF THE DRAWINGS

FIGS. 1 to 5 are circuit diagrams of different embodiments according to the present invention, respectively;

DETAILED DESCRIPTION OF THE EMBODIMENTS

First Embodiment

Figure 3:
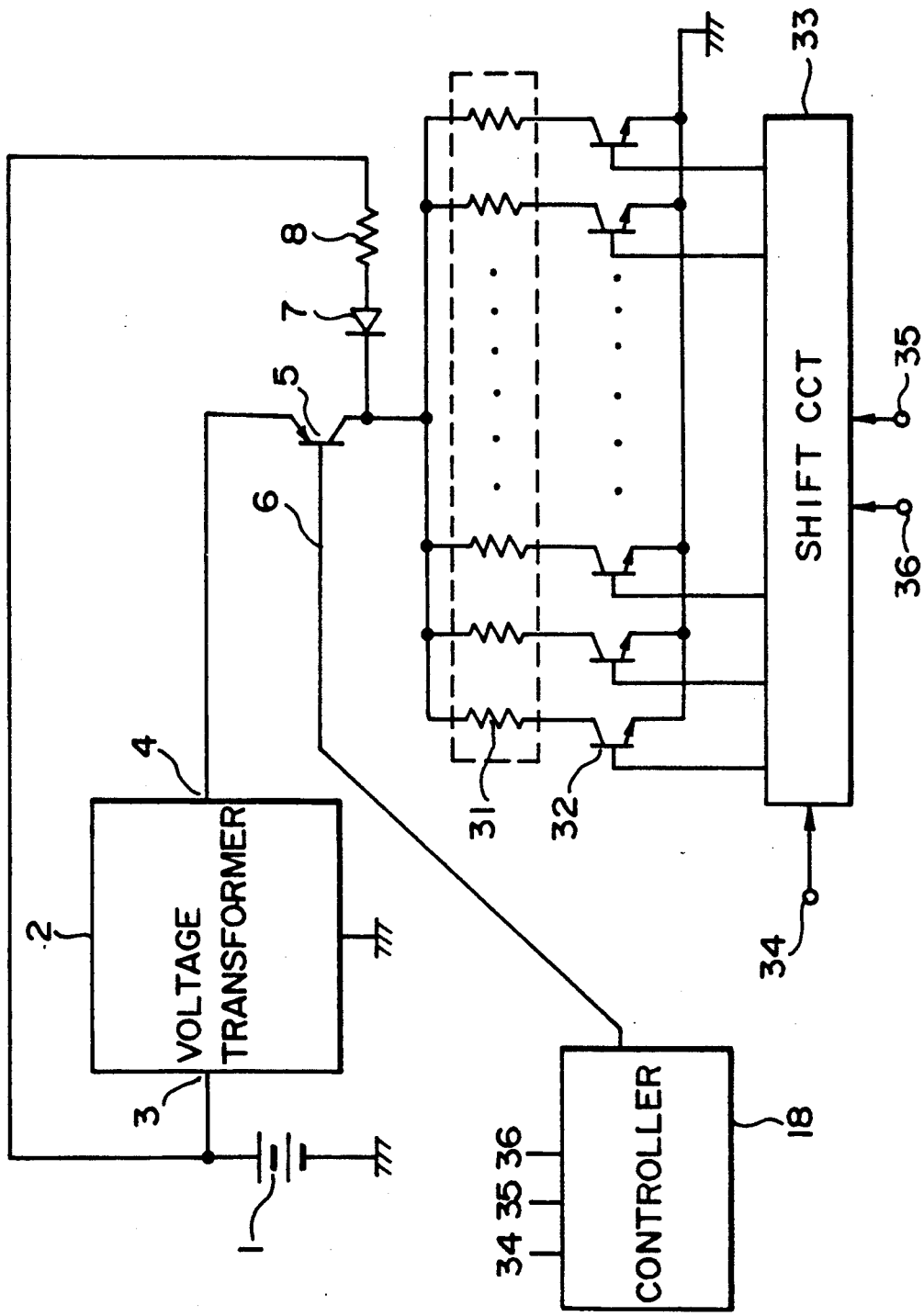

FIG. 1 is a view best illustrating the characteristic feature of the present invention. A power source circuit serving as a power source apparatus in FIG. 1 includes batteries 1 as a power source, a boosting voltage transformer 2 capable of transforming a power source voltage 3 from the batteries 1 into a constant voltage 4, and a 4-phase stepping motor 9 serving as a load connected to the voltage transformer 2. The 4-phase stepping motor 9 includes windings 9.1 to 9.4 of the four phases. The power source circuit also includes a transistor 5 for changing a source of current flowing through the motor 9 in response to a control signal 6 output from a controller 18 to control the ON/OFF operation of the transistor 5, a limiting resistor 8 for limiting currents directly flowing from the batteries 1 to the respective windings of the motor 9, a diode 7 for determining the direction of current, and transistors 10 to 13 for supplying currents to the phases 9.1 to 9.4 of the motor 9. The controller 18 outputs control signals 14 to 17 to respectively control ON/OFF operations of the transistors 10 to 13.

When the control signal 6 is set at "L" level, the transistor 5 is turned on, and a current flowing through the motor 9 is given as the voltage 4 obtained by transforming the power source voltage 3 of the batteries 1 by the voltage transformer 2. If the control signal 14 is set at "H" level and the transistor 10 is kept ON accordingly, a current flowing through the transistor 5 flows to GND through the winding 9.1 and the transistor 10. Similarly, if one of the control signals 14 to 17 is set at "H" level, the corresponding one of the transistors 10 to 13 is turned on or off, and a current flows or does not flow through the corresponding one of the windings 9.1 to 9.4 in accordance with the value of this control signal. The motor 9 is rotated in accordance with a sequence of the control signals 14 to 17. The controller 18 controls the overall operation of the power source circuit.

Figure 8:
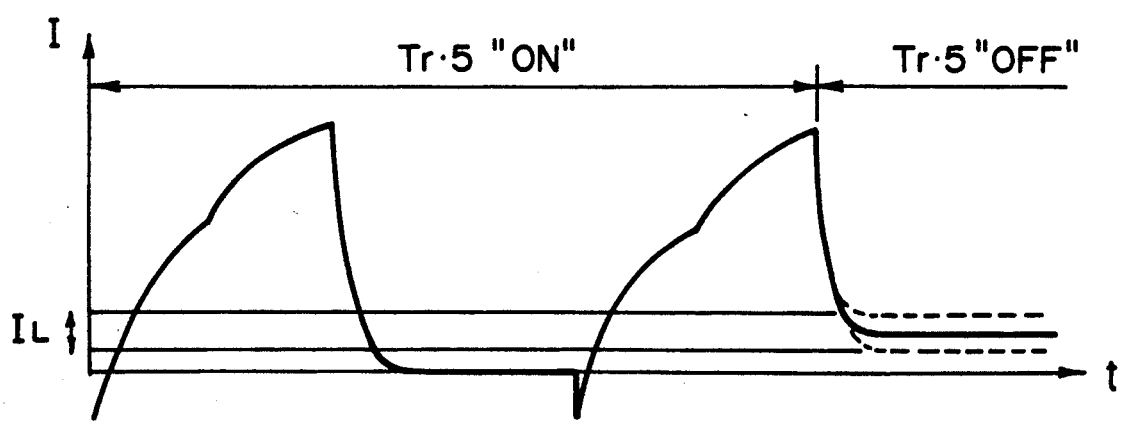
FIG. 8 is a chart showing a motor current waveform of the circuit shown in FIG. 1.
Figure 10:
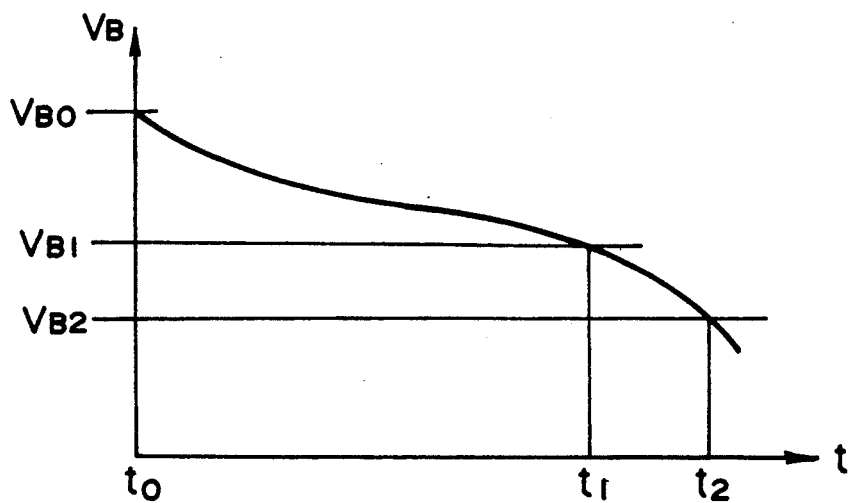
FIG. 10 is a graph showing a battery voltage.

FIG. 8 shows a current waveform of one phase when the motor 9 is driven by 2-phase excitation while the transistor 5 is kept ON. If this phase is exemplified by the winding 9.1, a current starts to flow upon ON operation of the transistor 10 and becomes zero when the transistor 10 is turned off. Thereafter, in the waveform of FIG. 8, the transistor 10 is kept ON. In this state, when the control signal 6 is set at "H" level, the transistor 5 is turned off. At this time, the current flowing through the motor 9 in FIG. 1 directly flows from the batteries 1 through the resistor 8 and the diode 7 without going through the voltage transformer 2. This current value is determined by the power source voltage 3 and the resistances (normally the same total resistance of the windings 9.1 to 9.4) of the resistor 8 and the windings 9.1 to 9.4. As shown in FIG. 10, the power source voltage 3 is gradually decreased with a lapse of time of use of the batteries (power source voltage 3=V). The voltage $B_{B0}$ at time t0 representing a nonused state of the batteries is decreased to $V_{B1}$ and $B_{B2}$ with lapses of time t1 and t2. In this embodiment, an allowable range of $B_B$ (t0 to t1) is set. The width of changes in current $I_L$ in the OFF state of the transistor in FIG. 8 represents the above operation.

Second Embodiment

FIG. 2 shows another embodiment of the present invention. This embodiment is different from the first embodiment in that a solenoid is connected in place of the motor as the load. Elements 1 to 8 have the same purposes and means as in the first embodiment. A power source circuit shown in FIG. 2 includes a solenoid 21, a transistor 23 for driving the solenoid 21 in response to an ON/OFF control signal 24 output from a controller 18, and a diode 22 for absorbing a counter electromotive force generated when the transistor 23 is turned off.

Figure 9:
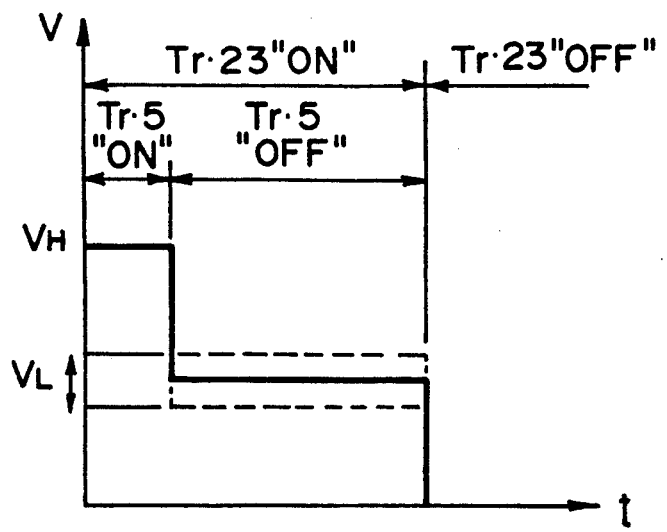
FIG. 9 is a chart showing a drive voltage waveform of a circuit shown in FIG. 2.

An operation of the circuit shown in FIG. 2 will be described with reference to FIG. 9. A voltage V is applied to the solenoid 21. When the transistors 5 and 23 are simultaneously ON, the voltage 4 output from the boosting voltage transformer 2 is applied to the solenoid 21. This voltage is defined as $V_H$. When the transistor 5 is turned off from this state, the voltage applied to the solenoid 21 has a value corresponding to a voltage applied from the batteries 1 through the resistor 8 and the diode 7. In this circuit, since the voltage transformer 2 boosts the input voltage, the input voltage is lower than an output voltage from the voltage transformer 2. This low voltage is defined as $V_L$. The voltage $V_L$ changes in proportion to the power source voltage 3. When stepwise control of the voltage shown in FIG. 9 is performed, and the voltage $V_H$ is a stable high voltage, the attraction force of the solenoid is increased. Once attracted, the solenoid continues the attraction even if the voltage level $V_L$ slightly varies, i.e., is not perfectly stable. In this case, it is still presumed that the power source voltage has an allowable range. Thereafter, when the transistor 23 is turned off in FIG. 2, a current does not flow in the solenoid, and the attraction force no longer acts Third Embodiment FIG. 3 shows still another embodiment of the present invention. This embodiment is different from the first embodiment in that a heating resistor (thermal head) is connected in place of the motor as a load. Elements 1 to 8 in the third embodiment have the same purposes and means as those of the first embodiment. A power source circuit of the third embodiment includes a heating resistor element array 31 which receives a current and is heated to print information on a printing medium, a transistor array 32 for driving the heating resistor element array 31, and a shift circuit 33 having an enable terminal 36, a serial data input terminal 34, and a serial clock input terminal 35 for shifting serial data input to the serial data input terminal 34.

Data representing which elements of the heating resistor element array 31 are to be driven is input from the input terminal 34 to the shift circuit 33. The input data is sequentially shifted in synchronism with a clock input to the serial clock input terminal 35. The input data which are sequentially input are simultaneously transmitted to the transistor array 32 in response to enable pulses input to the enable terminal 36, and transistors corresponding to the data are turned on to heat the corresponding heating resistors. In this embodiment, when the transistor 5 is kept ON, the power source voltage 3 is transformed to drive the heating resistor element array 31 with the high voltage output from the boosting voltage transformer 2. When the transistor 5 is kept OFF, the element array 31 is driven by the voltage from the batteries 1 through the resistor 8 and the diode 7. According to the characteristic feature of the circuit shown in FIG. 3, the transistor 5 is turned on to heat the heating resistor array 31 for performing normal printing During a non-printing interval, the transistor 5 is turned off to supply a small current from the batteries 1 to all or some of the elements of the heating resistor element array 31, thereby heating the head including the heating resistors to an appropriate temperature. With this arrangement, it is advantageous that energy required during printing can be minimized. A method of performing preheating is not a new technique. In the circuit having the above two objects, the element array is controlled with a stable voltage. When high precision is not required as in a secondary operation such as preheating, the power source voltage (batteries in this case) is used to control the element array, thereby minimizing the power consumption.

Fourth Embodiment

Figure 4:
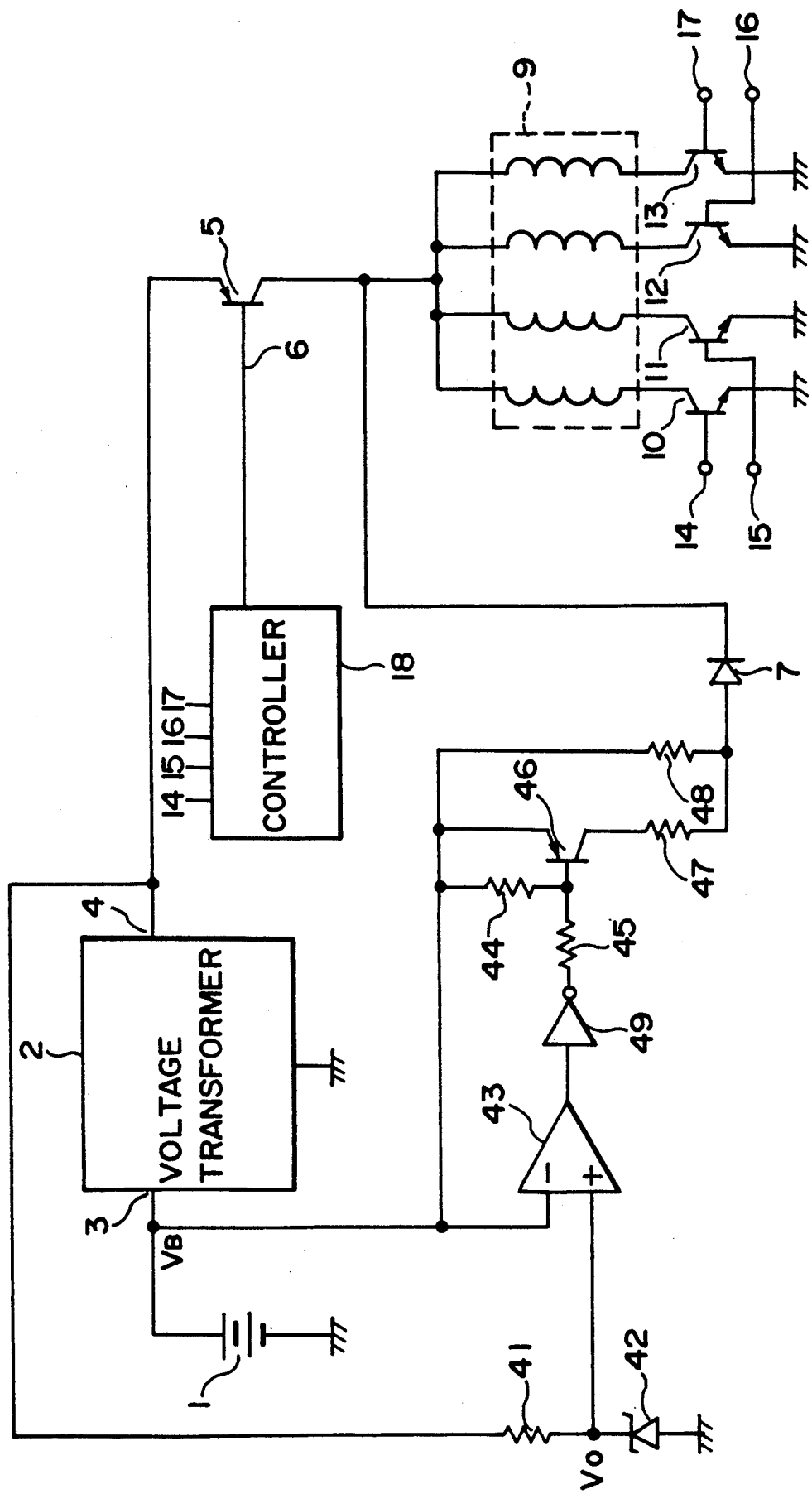

FIG. 4 shows still another embodiment. Elements 1 to 7 and 9 to 17 have the same purposes and means as those of the first embodiment. A power source circuit in the fourth embodiment includes a Zener diode 42 for generating a reference voltage V0, a resistor 41 for limiting a current flowing through the Zener diode 42 a comparator 43 for comparing a voltage $V_B.3$ from the batteries 1 serving as a power source and the reference voltage V0, an inverter 49 for inverting an output from the comparator 43, resistors 47 and 48 for limiting a current flowing from the batteries 1 to the motor 9, a transistor 46 for selecting a current flowing from the batteries 1 to the motor 9, and resistors 44 and 45 required for turning on the transistor 46.

Figure 11:
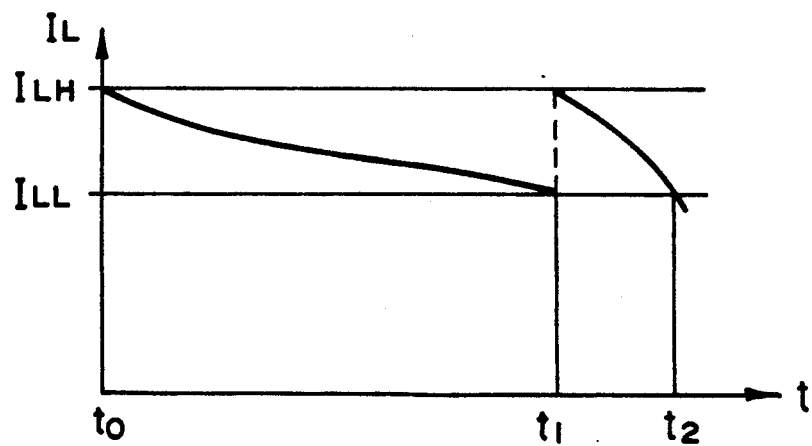
FIG. 11 is a chart showing a small current generated by a circuit shown in FIG. 4.

When the transistor 5 is kept ON, a current is supplied from the output 4 of the voltage transformer 2 to the motor 9 in the same manner as in FIG. 1. When the transistor 5 is kept OFF, a current flowing through the motor 9 is changed by a value of the power source voltage $V_B.3$. Referring to FIG. 10, if $V_B.1=V0$, the value of the interval between times t0 and t1 satisfies inequality $V_B>V0$. An output from the comparator 43 goes to "L" level, and the transistor 46 is turned off. In this case, a current flowing through the motor 9 flows through only the resistor 48. During an interval between times t1 and t2, inequality $V_B<V0$ is satisfied, and the transistor 46 is turned on. At this time, a current flows through both the resistors 47 and 48. This current value is increased at time t1, as shown in FIG. 11. Currents during the intervals between times t0 and t1 and between times t1 and t2 change in the range of $I_{LH}$ to $I_{LL}$. Therefore, the range for compensating for the small current is defined by the time interval between times t0 and t2 and can be increased as compared with the circuit of FIG. 1. If so, an optimal $I_L$ current can flow during the interval between times t0 and t1, thereby prolonging the service life of the batteries.

Fifth Embodiment

Figure 5:
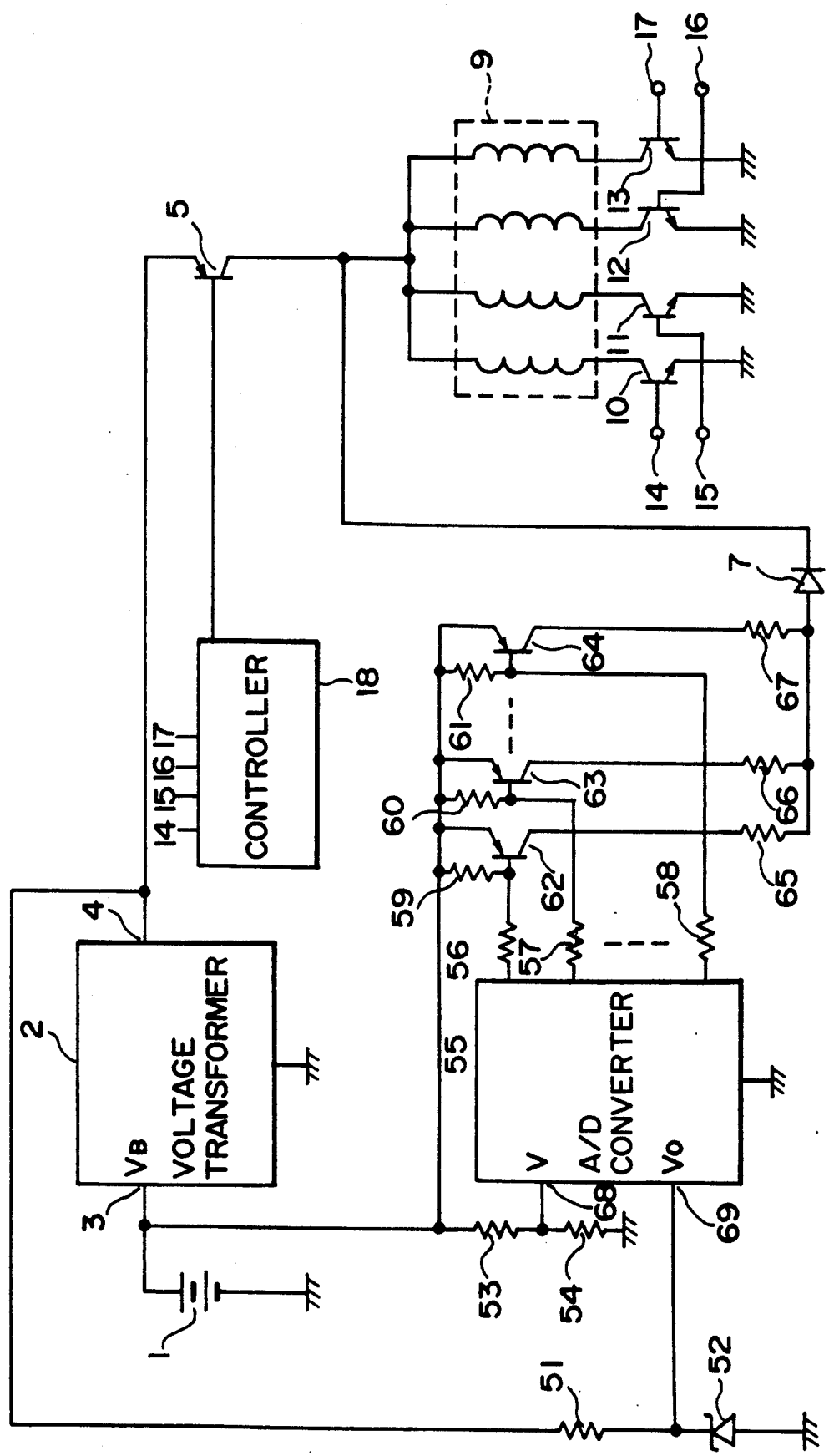

FIG. 5 shows still another embodiment of the present invention. A circuit in the fifth embodiment shows an improved circuit of FIG. 4. Elements 1 to 7 and 9 to 17 in this embodiment have the same purposes and means as those in FIG. 1. The circuit shown in FIG. 5 includes an A/D converter 55, a Zener diode 52 for generating a reference voltage V0 69 of the A/D converter 55, a resistor 51 for limiting a current flowing through the Zener diode 52, and resistors 53 and 54 for dividing a power source voltage $V_B$ into ½. An analog voltage $V_A$ 68 input to the A/D converter 55 is obtained at the middle connecting point between the resistors 53 and 54. The circuit of FIG. 5 also includes resistors 65 to 67 for limiting a current flowing through the motor 9, transistors 62 to 64 for selecting one of the resistors which is rendered conductive, and resistors 56 to 58 and 59 to 61 for turning on the transistors 62 to 64. In this embodiment, when the transistor 5 is kept ON, the same operation as in FIG. 1 or 4 is performed. When the transistor 5 is kept off, a current flowing through the motor 9 is changed in accordance with an output state of the A/D converter 55. When a voltage $V_A$ 68 obtained by dividing the power source voltage $V_B$ changes with respect to the value of the reference voltage V0 69, the A/D converter 55 converts the changed analog input value and outputs a digital signal for turning on one of the transistors 62 to 64. A current flows from the batteries 1 to the motor 9 through one of the resistors 65 to 67. This resistance value is appropriately selected with respect to the power source voltage $V_B$, thereby reducing the difference between the currents $I_{LH}$ and $I_{LL}$ in FIG. 11. In this case, the number of abrupt change points (e.g., t1 in FIG. 11) of the current $I_L$ corresponds to the number of outputs from the A/D converter 55. The embodiment shown in FIG. 5 is effective when high precision of a circuit serving as a load in the $I_L$ current mode is required Effects obtained by the present invention will be described for the above embodiments.

(1) First to Third Embodiments

If there is an apparatus which does not always require a stable current in the second operation (i.e., in the OFF state of the transistor 5), this current is obtained from the voltage prior to the voltage transformation. Therefore, the power consumption upon transformation by the voltage transformer can be reduced, and the service life of the batteries in the apparatus using the batteries as a power source can be prolonged.

(2) Fourth and Fifth Embodiments

The range for compensating for variations in the power source voltage can be increased. In an apparatus using batteries, the service life can be further prolonged as compared with the effect (1).

What is claimed is:

1. A power source apparatus used in electronic equipment, comprising:
   a power source for supplying a power source voltage;
   voltage transforming means for transforming the power source voltage supplied from said power source into a voltage different from the power source voltage;
   driving means driven by one of the voltage output from said voltage transforming means and a voltage obtained directly from the power source voltage, said driving means being settable in one of first and second conditions;
   switching means for switching between the voltage output from said voltage transforming means and the voltage obtained directly from the power source voltage and for supplying one of the voltage output from said voltage transforming means and the voltage obtained directly from said power source to said driving means; and
   control means for switching said switching means to select the voltage output from said voltage transforming means when said driving means is in the first condition, and for switching said switching means to select the voltage obtained directly from the power source voltage when said driving means is in the second condition.

2. An apparatus according to claim 1, wherein said driving means is a stepping motor.

3. An apparatus according to claim 2, wherein said stepping motor is rotated in the first condition and is at rest in the second condition.

4. An apparatus according to claim 1, wherein said driving means is a solenoid.

5. An apparatus according to claim 1, wherein said driving means is a thermal printing head.

6. A power source apparatus used in electronic equipment, comprising:

a power source for supplying a power source voltage;

voltage transforming means for transforming the power source voltage supplied from said power source into a voltage different from the power source voltage;

driving means driven by one of the voltage output from said voltage transforming means and a voltage obtained directly from the power source voltage, said driving means being settable in one of first and second conditions;

switching means for switching between the voltage output from said voltage transforming means and the voltage obtained directly from the power source voltage and for supplying one of the voltage output from said voltage transforming means and the voltage obtained directly from said power source voltage to said driving means;

first control means for switching said switching means to select the voltage output from said voltage transforming means when said driving means is in the first condition and for switching said switching means to select the voltage obtained directly from the power source voltage when said driving means is in the second condition; and second control means for adjusting the voltage obtained directly from the power source voltage in response to the level of the power source voltage.

7. An apparatus according to claim 6, wherein said driving means is a stepping motor.

8. An apparatus according to claim 7, wherein said stepping motor is rotated in the first condition and is at rest in the second condition.

9. An apparatus according to claim 6, wherein said driving means is a solenoid.

10. An apparatus according to claim 6, wherein said driving means is a thermal printing head.

11. A power source apparatus used in electronic equipment, comprising:

a power source for supplying a power source voltage;

voltage transforming means for transforming the power source voltage supplied from said power source into a voltage different from the power source voltage;

driving means driven by the voltage supplied from said power source;

switching means for switching between the voltage output from said voltage transforming means and the voltage directly output from said power source and supplying one of the voltages output from said voltage transforming means and said power source to said driving means; and control means for switching said switching means in accordance with an operating state of said driving means.

12. An apparatus according to claim 11, wherein said driving means is a stepping motor.

13. An apparatus according to claim 12, wherein said stepping motor is rotated in the first condition and is at rest in the second condition.

14. An apparatus according to claim 11, wherein said driving means is a solenoid.

15. An apparatus according to claim 11, wherein said driving means is a thermal printing head

* * * * *

UNITED STATES PATENT AND TRADEMARK OFFICE
CERTIFICATE OF CORRECTION

PATENT NO.  : 5,021,728
DATED       : June 4, 1991
INVENTOR(S) : SHOJI SATO

Page 1 of 2

It is certified that error appears in the above-identified patent and that said Letters Patent is hereby corrected as shown below:

COLUMN 1

Figure 6:
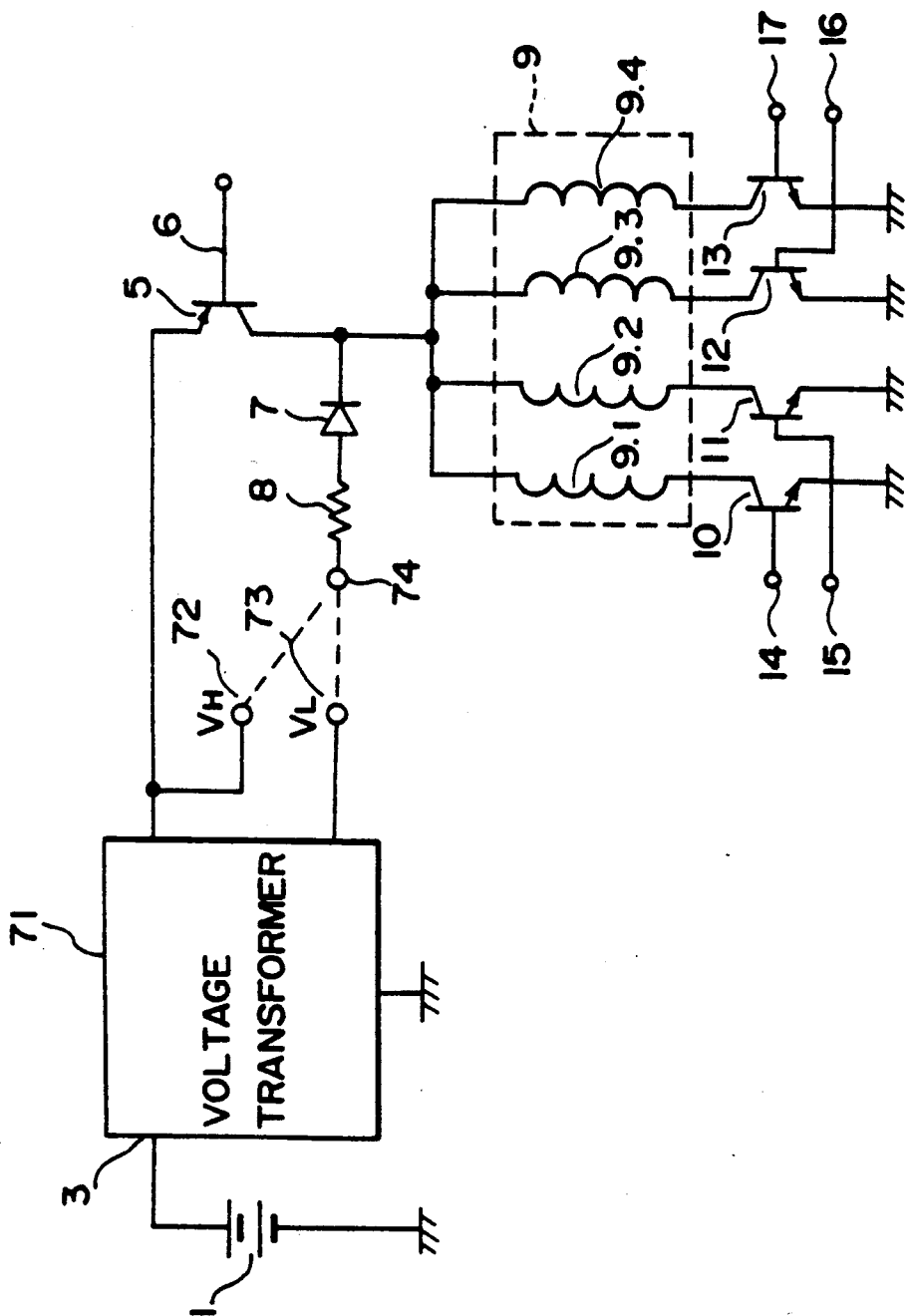
FIG. 6 is a circuit diagram showing a conventional power source apparatus.
Figure 7:
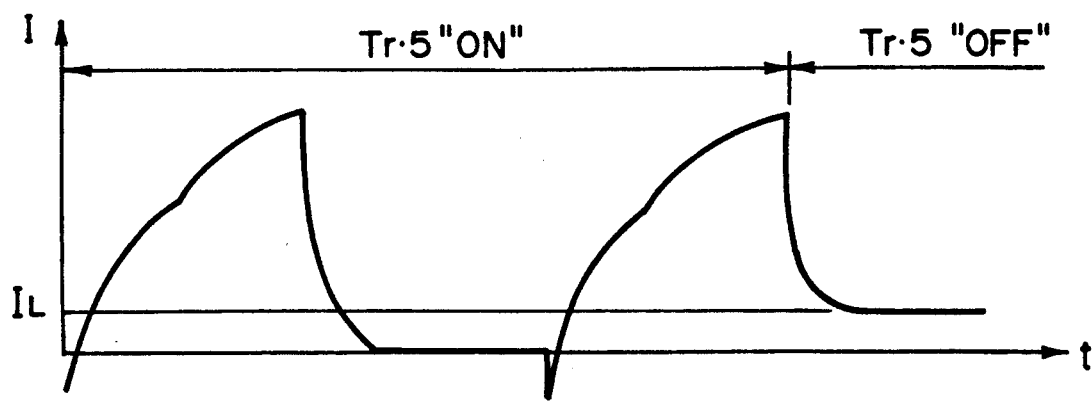
FIG. 7 is a chart showing a motor current waveform of the circuit shown in FIG. 1.

Line 6, "(a)" should read --1.--.
    Line 10, "(b)" should read --2.--.
    Line 18, "batteries 1" should read --battery 1--.
    Line 63, "FIG. 6 when" should read --FIG. 6, when--.
    Line 68, "batteries" should read --battery--.

COLUMN 2

Line 43, "DESCRI$_p$TION" should read --DESCRIPTION--.

COLUMN 3

Line 49, "voltage 3=V" should read --voltage 3=$V_B$).--.
    Line 50, "voltage $B_{BO}$" should read --voltage $V_{BO}$--.
    Line 51, "$B_{B2}$" should read --$V_{B2}$--.
    Line 53, "$B_B$(t0 to t1)" should read --$B_B$(tD to t1)--.

COLUMN 4

Line 24, "acts" should read --acts.--.
    Line 60, "printing During" should read --printing. During--.

UNITED STATES PATENT AND TRADEMARK OFFICE
CERTIFICATE OF CORRECTION

PATENT NO.  : 5,021,728
DATED       : June 4, 1991
INVENTOR(S) : SHOJI SATO

It is certified that error appears in the above-identified patent and that said Letters Patent is hereby corrected as shown below:

COLUMN 5

Line 13, "diode 42 a" should read --diode 42, a--.

Signed and Sealed this

Ninth Day of February, 1993

Attest:

STEPHEN G. KUNIN

*Attesting Officer*    Acting Commissioner of Patents and Trademarks